United States Patent
Hiramatsu et al.

(10) Patent No.: US 12,115,739 B2
(45) Date of Patent: Oct. 15, 2024

(54) METHOD FOR PRODUCING FIBER-REINFORCED PLASTIC COMBINED BODY FROM PREPREG

(71) Applicant: IHI Corporation, Tokyo (JP)

(72) Inventors: Mikio Hiramatsu, Tokyo (JP); Tadashi Jyunisho, Kanagawa (JP)

(73) Assignee: IHI Corporation, Tokyo (JP)

( * ) Notice: Subject to any disclaimer, the term of this patent is extended or adjusted under 35 U.S.C. 154(b) by 271 days.

(21) Appl. No.: 17/651,290

(22) Filed: Feb. 16, 2022

(65) Prior Publication Data

US 2022/0168973 A1 Jun. 2, 2022

Related U.S. Application Data (63) Continuation of application No. PCT/JP2020/035175, filed on Sep. 17, 2020.

(30) Foreign Application Priority Data

Oct. 3, 2019 (JP) .................. 2019-182948

(51) Int. Cl.
| | |
|---|---|
| B29C 33/46 | (2006.01) |
| B29C 70/00 | (2006.01) |
| B29C 70/44 | (2006.01) |
| B29C 70/54 | (2006.01) |
| B29C 71/02 | (2006.01) |

(Continued)

(52) U.S. Cl.
CPC ............ *B29C 70/44* (2013.01); *B29C 70/003* (2021.05); *B29C 70/542* (2013.01); *B29C 2791/006* (2013.01); *B29K 2039/06* (2013.01); *B29K 2079/08* (2013.01); *B29K 2105/0872* (2013.01)

(58) Field of Classification Search
CPC ....... B29C 33/46; B29C 70/003; B29C 70/44; B29C 70/54; B29C 70/542; B29C 71/02; B29C 2791/006; C08J 5/04; C08J 5/24
USPC .......... 264/101, 236, 257, 258, 313, 331.12, 264/331.19
See application file for complete search history.

(56) References Cited

U.S. PATENT DOCUMENTS

| | | | |
|---|---|---|---|
| 3,666,600 A | 5/1972 | Yoshino | |
| 4,944,824 A | 7/1990 | Gupta | |

(Continued)

FOREIGN PATENT DOCUMENTS

| | | | |
|---|---|---|---|
| JP | 02-258221 A | 10/1990 | |
| JP | 06-21 0640 A | 8/1994 | |

(Continued)

OTHER PUBLICATIONS

Extended European Search Report Issued Sep. 27, 2023 in European Application 20870698.6, 6 pages.

(Continued)

*Primary Examiner* — Leo B Tentoni
(74) *Attorney, Agent, or Firm* — Oblon, McClelland, Maier & Neustadt, L.L.P.

(57) ABSTRACT

A method for producing a fiber-reinforced plastic combined body from a prepreg, includes: heating the prepreg in an atmosphere above a room temperature and lower than a curing temperature of the prepreg; provisionally combining pre-products obtained by the heating together or with another component; and retaining and curing the combined pre-products at the curing temperature or higher.

7 Claims, 7 Drawing Sheets

(51) Int. Cl.
  *C08J 5/04* (2006.01)
  *C08J 5/24* (2006.01)
  *B29K 79/00* (2006.01)
  *B29K 105/08* (2006.01)

(56) References Cited

U.S. PATENT DOCUMENTS

| | | | |
|---|---|---|---|
| 5,104,474 A * | 4/1992 | Scola | C08J 5/248 |
| | | | 156/286 |
| 5,261,993 A | 11/1993 | Dahlgren | |
| 9,631,090 B2 | 4/2017 | Deets et al. | |
| 2010/0285265 A1 | 11/2010 | Shinoda et al. | |
| 2017/0368812 A1 | 12/2017 | Palmieri et al. | |
| 2018/0370096 A1 | 12/2018 | Fuchs et al. | |

FOREIGN PATENT DOCUMENTS

| | | |
|---|---|---|
| JP | 8-506534 A | 7/1996 |
| JP | 2010-150685 A | 7/2010 |
| JP | 2012-187730 A | 10/2012 |
| JP | 2018-518403 A | 7/2018 |

OTHER PUBLICATIONS

International Search Report issued Oct. 13, 2020 in PCT/JP2020/035175 filed on Sep. 17, 2020, 2 pages.
Japanese Office Action issued on Jan. 24, 2023 in Japanese Patent Application No. 2021-550597, 4 pages.

* cited by examiner

FIG. 7

METHOD FOR PRODUCING FIBER-REINFORCED PLASTIC COMBINED BODY FROM PREPREG

CROSS-REFERENCE TO RELATED APPLICATIONS

This application is a Continuation application of PCT International Application No. PCT/JP2020/035175 (filed Sep. 17, 2020), which is in turn based upon and claims the benefit of priority from Japanese Patent Application No. 2019-182948 (filed Mar. 10, 2019), the entire contents of which are incorporated herein by reference.

BACKGROUND

Technical Field

The disclosure herein relates to a method for producing a fiber-reinforced plastic combined body from a prepreg and in particular relates to a method for sufficiently removing solvents including poorly volatile solvents in particular from a prepreg to produce pre-products and then combine the pre-products together to produce a combined body.

Description of the Related Art

In various technical fields, many trials have been persistently conducted to use lighter materials for the purposes of energy saving and improvement in various properties. In the aerospace field for example, aluminum alloys are being replaced by fiber reinforced plastics (FRPs) and other trials are also under way to replace nickel-based superalloys with ceramic matrix composites (CMGs).

In the aerospace field, thermal resistance is of course an essential characteristic and thus materials are chosen individually on the basis of applied temperature ranges. FRPs are, as containing constitutional resins generally having glass transition temperatures lower than 300 degrees C., generally used in the low temperature range above the room temperature and not higher than 250 degrees C. In addition, as any welding technic such as welding or brazing is unavailable to FRPs unlike metals and as well bonding by adhesives is inferior in both strength and thermal resistance, FRPs are not suitable for producing a structured body such as a combined body of a disk and a blade.

Specifically, because there are few options in the middle temperature range above 300 degrees C. aside from few exceptions such as titanium alloys and fiber-reinforced metals (FRMs), means for weight reduction have been still limited.

Japanese Patent Applications Laid-open Nos. 2010-150685 and 2012-187730 disclose related arts.

SUMMARY

Since polyimide resins could have transition temperatures above 300 degrees C. or even close to 400 degrees C., they raise expectations for application to FRPs usable in the middle temperature range above 300 degrees C. As the polyimide resins are solid even before curing (hardening by heating), generally resins are supported in solvents such as N-methyl-2-pyrrolidone (NMP) for example before forming a matrix with reinforcing fibers. But this solvent is known to be poorly volatile.

According to studies by the present inventors, it is found that the glass transition temperature is measurably affected by residual NMP remaining in the preform and change of the NMP content in the order of several per mille in weight permillage to the total weight of the preform and control of the NMP content would be insufficient given that removal thereof were left solely in evaporation at the time of curing. On the other hand, as the polyimide resins without solvents do not have sufficient fluidity, any other bonding means such as adhesion are required to combine plural components.

The present inventors have further conducted earnest studies in light of these problems and have found that methods described below successfully control the remaining NMP content in the order of several per mille in weight permillage and also combine plural components together without any adhesion.

According to an aspect, a method for producing a fiber-reinforced plastic combined body from a prepreg, includes: heating the prepreg in an atmosphere above a room temperature and lower than a curing temperature of the prepreg; provisionally combining pre-products obtained by the heating together or with another component; and retaining and curing the combined pre-products at the curing temperature or higher.

Advantageous Effects

A method for producing a fiber-reinforced plastic combined body is provided, which can control the remaining NMP content in the order of several per mille in weight permillage and can also combine plural components together.

DESCRIPTION OF EMBODIMENTS

Exemplary embodiments will be described hereinafter with reference to the appended drawings.

In the following description, an example will be described, in which a carbon fiber reinforced plastic (CFRP) is produced from a prepreg of a polyimide resin dissolved in N-methyl-2-pyrrolidone (NMP) infiltrating in carbon fiber tow (a non-woven bundle of carbon fibers). As will be understood from the following description, however, the present embodiment is not inherently limited to polyimide resins but could be applied to any cases using various other poorly volatile solvents generally, and various materials, such as graphite, glass, Kevlar (registered trademark) and silicon carbide, are applicable to the reinforcing fibers.

Figure 1:
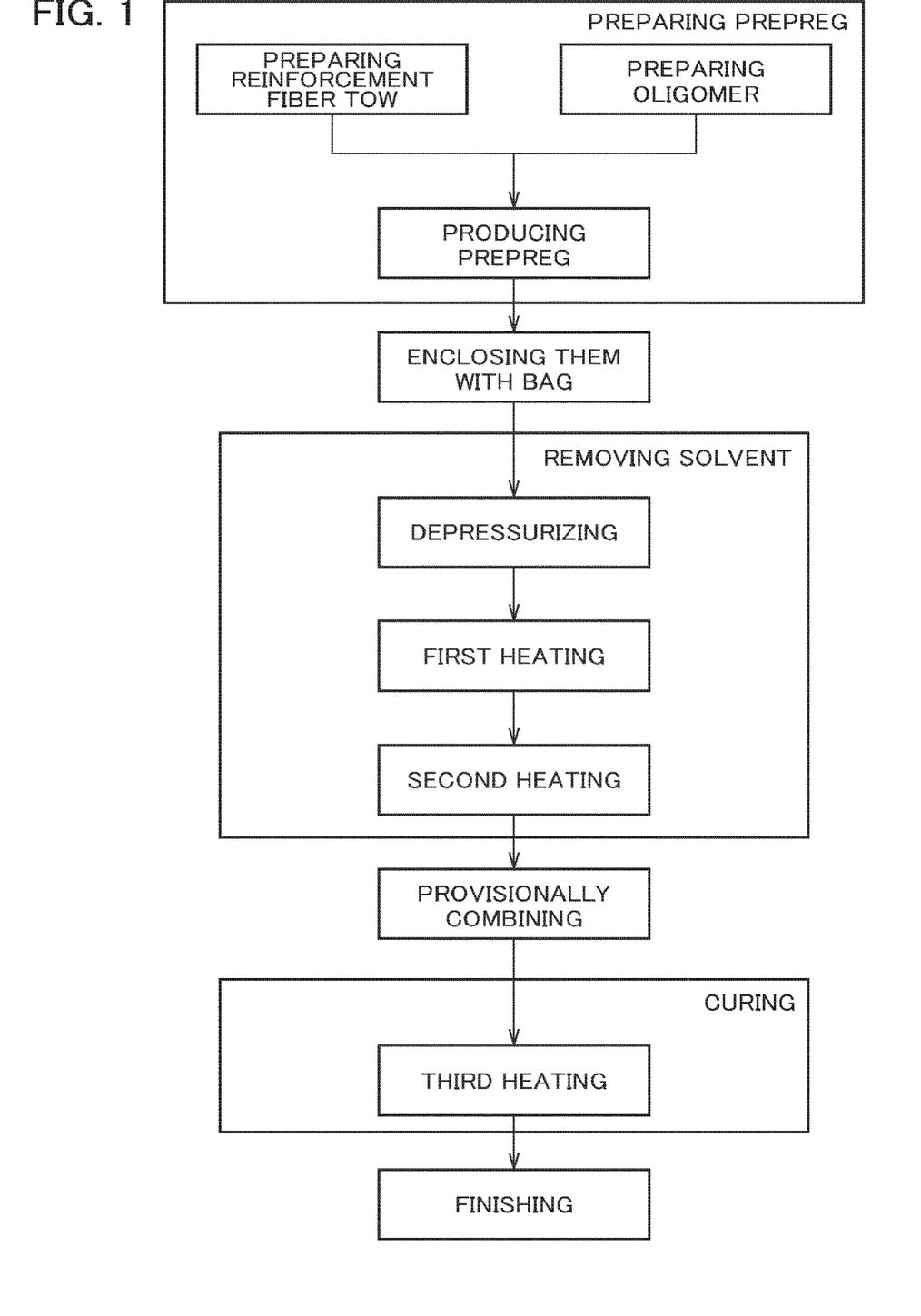
FIG. 1 is a flowchart schematically describing a method for producing a fiber-reinforced plastic combined body from a prepreg according to an embodiment.

Referring mainly to FIG. 1, a method for producing a fiber-reinforced plastic combined body in accordance with the present embodiment generally consists of preparing a prepreg, heating the prepreg under reduced pressure to remove a solvent therefrom, provisionally combining pre-products obtained thereby together, and further heating the provisionally combined pre-products up to a temperature higher than a curing temperature of the resin to cure the resin (curing).

As the reinforcing fibers, any available carbon fibers are usable and not-woven tow or woven fabrics may be applied thereto. Fibers available in the name of MR-50R (Mitsubishi Rayon Co., Ltd. at that time) are arranged in parallel generally on a plane and impregnated with a resin.

As the resin subject to impregnation, one obtained by dissolving thermally addition-type imide oligomer in NMP for example may be used. More specifically, for example, pyromellitic anhydride acid (PMDA), 2-phenyl-4,4'-diamino diphenyl ether (p-ODA), 9,9-bis(4-amino phenyl) fluorine (BAFL) and 4-phenylethynyl phthalic acid anhydride (PEPA) admixed in a ratio of 4:4.5:0.5:2 (mass ratio) and dissolved in NMP are used.

The carbon fiber tow is impregnated with the aforementioned resin to produce a prepreg.

The prepreg is heated at a relatively low temperature in a depressurized atmosphere to remove NMP from the prepreg. For the heating, any furnace having ability for temperature control is usable. Or, possibly usable is a furnace having ability to control conditions about an atmosphere including a pressure. The following description will be based on an example in which an autoclave and a publicly-known bagging method for depressurizing are used in combination but the method is not inherently limited thereto.

Figure 2:
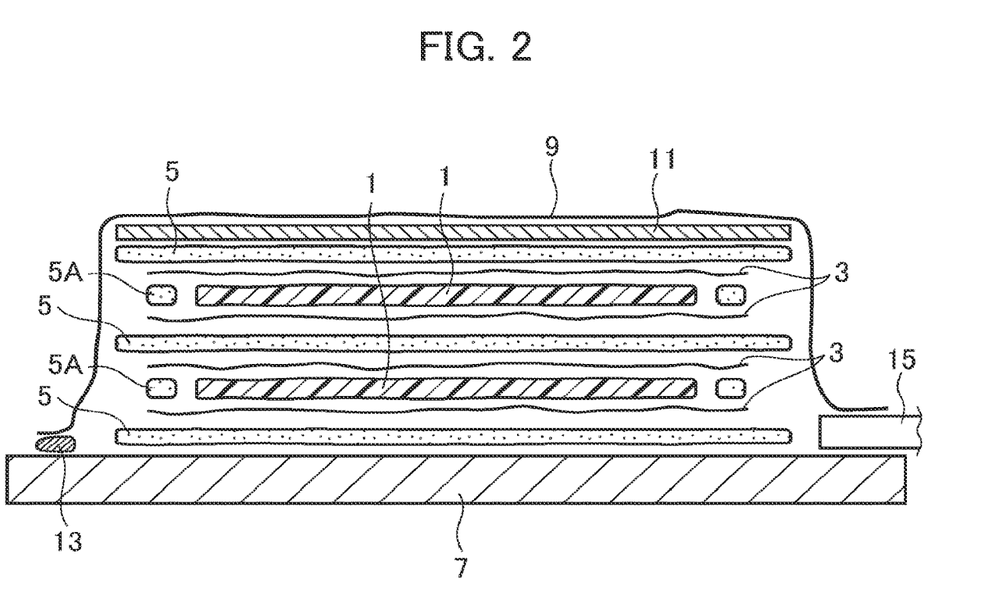
FIG. 2 is a schematic sectional elevational view of the prepreg, films and gas-permeable bodies in a bag.

Referring to FIG. 2, according to the method using the bagging, each one ply of a prepreg 1 is put in between porous films 3 and the prepreg 1 along with the porous films 3 is put in between layers of gas-permeable bodies 5.

To cover both faces of the prepreg 1 with the porous films 3 is of assistance in preventing leakage of the resin and further preventing the prepreg 1 from shrinking. As the porous films 3, in light of delamination from the prepreg 1, any films formed of a hydrophobic and lipophobic substance such as polytetrafluoroethylene, or any other substance with hydrophobic and lipophobic finishing, can be used. While such films should have through-holes in order not to prevent evaporation of NMP, such holes are required to be small enough to prevent leakage of the resin and, more specifically, the films are required to be porous. As such a porous film, polytetrafluoroethylene coated glass fibers, and particularly a film available in the name of RELEASE EASE 234 TFP-1 38"X100YDS (Airtech Corp.), can be exemplified but is not limiting.

The layered gas-permeable bodies 5 are helpful to retain pathways through which evaporating NMP escapes in the planar direction. Each gas-permeable body 5 has a structure through which gas can permeate in the planar direction like as a woven or non-woven fabric, and has some stiffness in order to avoid crushing and thus retain pathways even under reduced pressure. Carbon fibers and glass fibers are examples for such materials and in particular a glass fiber available in the name of E10T 4W106TT (UNITIKA GLASS FIBER Co., Ltd.) can be exemplified but is not limiting.

The set of the prepreg 1, the porous films 3 and the gas-permeable bodies 5 may be single but alternatively plural sets of the prepregs 1 and the porous films 3 are stacked with putting the gas-permeable bodies 5 in therebetween. As the gas-permeable bodies 5 retain pathways for gas, evaporation of NMP is not disturbed even though the plural sets are stacked. To promote evaporation of NMP, it is preferable to set the prepregs 1 apart from each other but a limited number of prepregs 1 may be directly stacked.

To promote evaporation and escape of NMP through end faces of each prepreg 1, strip-like gas permeable bodies 5A may be attached along the respective end faces. To the gas-permeable bodies 5A applicable are carbon fibers or glass fibers as with the above description.

One set or plural sets of the prepregs 1, the porous films 3 and the gas-permeable bodies 5 are placed on a base 7 such as a flat metal sheet for example. Dams may be placed therearound in order to act against the atmospheric pressure. A tube 15 for communication with a vacuum system is placed close thereto and the whole thereof is covered with a gas-impermeable bag 9.

Alternatively, a pressure plate 11 may be interposed between the bag 9 and the uppermost layer so as to use the atmospheric pressure acting thereon for molding the prepreg 1. If shapes corresponding to, or close to, those of products are given to the pressure plate 11 and the base 7, the bagging therewith simultaneously enables molding as well. This could be used as finishing or preliminary formation prior to the finishing.

Figure 3A:
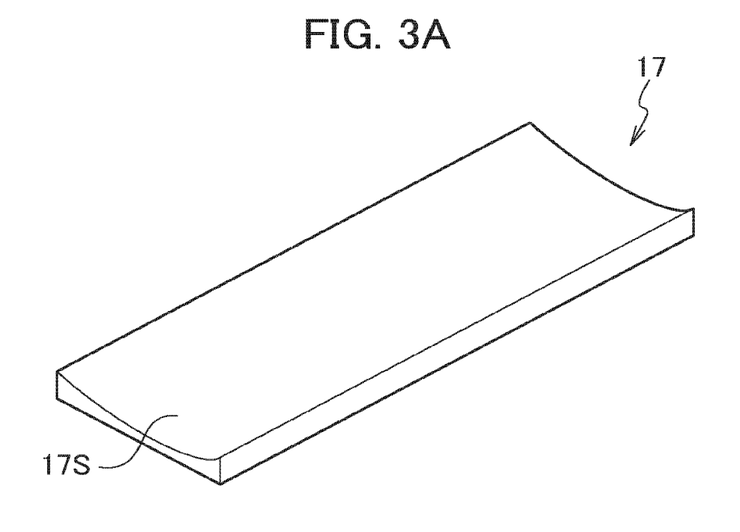
FIG. 3A is a schematic perspective view of a mold for molding according to an example.
Figure 3B:
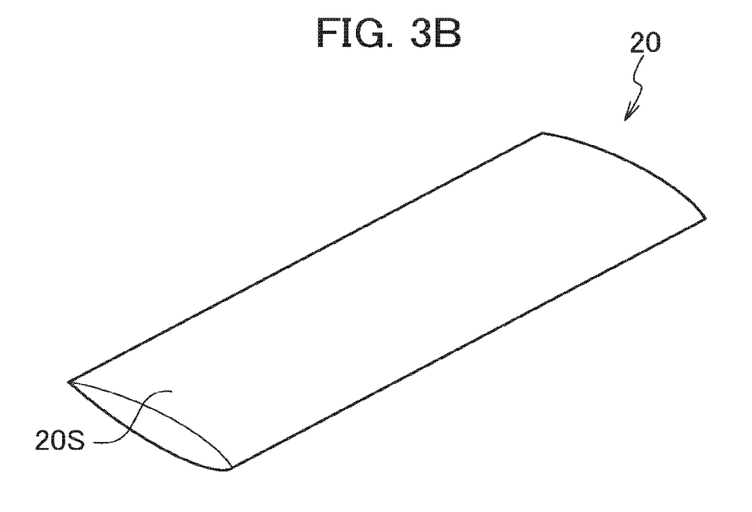
FIG. 3B is a schematic perspective view of a formed component according to the example.
Figure 4A:
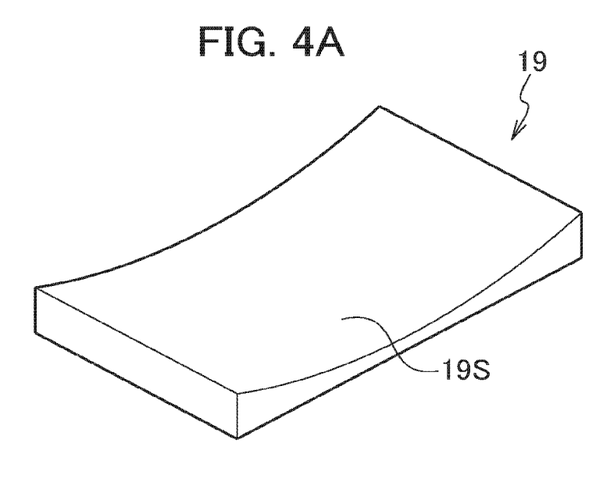
FIG. 4A is a schematic perspective view of a mold for molding according to another example.
Figure 4B:
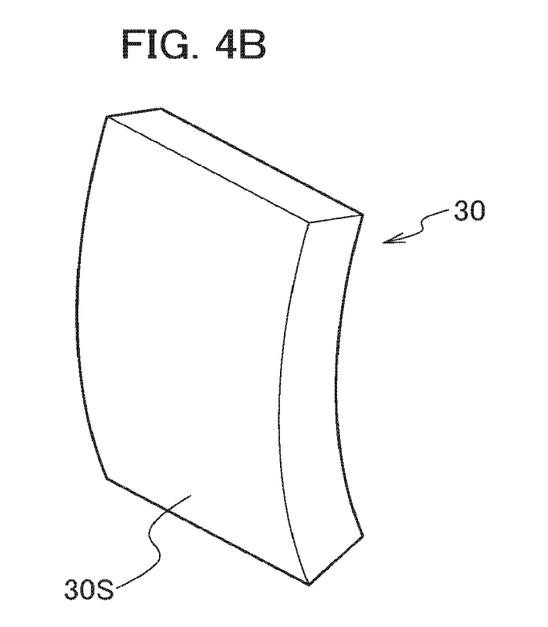
FIG. 4B is a schematic perspective view of a formed component according to another example.

For the purpose of molding, although not shown in FIG. 2, molds 17, 19 such as those shown in FIGS. 3A and 4A may be used. The mold 17 exemplarily shown in FIG. 3A is to form a blade pre-product 20 having a shape of a blade as exemplarily shown in FIG. 3B, and the mold 19 exemplarily shown in FIG. 4A is to form a disk portion pre-product 30 having a shape of a disk exemplarily shown in FIG. 4B. The mold 17 or the mold 19 is, in place of the pressure plate 11 or so as to put the prepreg 1 in between it and the pressure plate 11, set along the prepreg 1. The atmospheric pressure acting on the pressure plate 11 or the mold 17 or 19 forms the prepreg 1 to give it a complementary shape to any of the molds. In a case of the mold 17, the pre-product 20 is given a blade surface shape 20S that is complementary to the surface profile 17S thereof. In a case of the mold 19, the pre-product 30 is given a cylindrical shape 30S that is complementary to the surface profile 19S thereof.

Needless to say, any mold having any arbitrary shape is available, thereby forming a pre-product having any desired shape. The molding may be executed in the process of heating for removing NMP as described later, or may be executed independently from the heating.

Next, gas-tight sealing is established by means of a seal 13 attached around the bag 9, the whole thereof is introduced into the autoclave, and the tube 15 is connected to the vacuum system. To the vacuum system, a combination of a rotary vacuum pump and a mechanical booster pump for example is connected, and any proper vacuum gauge such as a Pirani gauge is connected, whereas the vacuum system is not limited thereto. Further, a trap for capturing evaporated NMP may be connected to the vacuum system.

Next, heating for removing NMP is executed. This heating is achieved under reduced pressure and includes a first heating at a relatively low temperature (above a room temperature but not higher than 100 degrees C.) and a second heating at a higher temperature (not lower than 150 degrees C. but lower than a curing temperature of the prepreg).

The first heating and the second heating may be executed discontinuously, or may be executed continuously. Or, before shifting to the second heating, the degree of vacuum may be once reduced (or once back to the atmospheric pressure), or alternatively the reduced pressure may be retained. Still alternatively, the degrees of vacuum at the first heating and the second heating may be differentiated. The following description will be based on an example in which the first heating and the second heating are continuously executed with keeping the degree of vacuum.

The interior of the bag 9 is depressurized via the tube 15. The degree of vacuum is measured by a Pirani gauge for example and is controlled by means of the vacuum system to be not higher than 1 Torr (0.133 kPa).

With keeping the degree of vacuum, the first heating is executed. The first heating includes elevating the temperature by a rate of 5 degrees C./min from the room temperature and keeping the temperature at 50 degrees C. for 2 hours, for example. The temperature elevation rate may be selected properly and the holding temperature may be selected from a range from 30 degrees C. to 100 degrees C. Any higher temperature elevation rates would be more helpful to efficiency improvement and higher holding temperatures would be more helpful to promotion of evaporation. Overly high holding temperatures, however, might rather lead to reduction in efficiency of NMP removal. Thus the holding temperature may be lower than 150 degrees C., or more preferably not higher than 100 degrees C., or further preferably lower than 100 degrees C.

As the boiling point of NMP is around 202 degrees C., the aforementioned temperature range is considerably lower than the boiling point but the pressure reduction causes NMP evaporation. As the evaporated NMP could be captured by the trap, removal thereof from the prepregs 1 could be visually observed. The resin contained in the prepregs 1 are still semisolid in this temperature range and therefore the prepregs 1 substantially keep its macroscopic shape. On the other hand, NMP escaping from the prepregs 1 leave minute hollows therein, which are considered to be useful as pathways for further escape in the second heating process.

The holding time at the holding temperature may be also arbitrarily selected. Any longer duration would be more helpful to sufficient removal of NMP but overly long duration might decrease productivity. Thus the time may be 24 hours or shorter, or preferably 6 hours or shorter, or more preferably 2 hours or shorter. As overly short duration might lead to insufficient removal of NMP, the time may be 10 minutes or longer, or preferably 30 minutes or longer, or more preferably 1 hour or longer.

With keeping the depressurized state, or with controlling the degree of vacuum, the second heating is executed by elevating the temperature. The rate of temperature elevation is for example 3 degrees C./min, and the temperature is kept at 150 degrees C. for 1 hour for example, and further the temperature is elevated at the rate of 3 degrees C./min for example, and the temperature is kept at 280 degrees C. for 1 hour for example. While the resin is still semisolid around 150 degrees C., as it is higher in temperature than the first heating, it is possible to promote evaporation of NMP. Alternatively, it may be kept at any temperature above around 150 degrees C. and not higher than 200 degrees C., or without keeping such a temperature range, temperature elevation up to 200 degrees C. or higher may be directly executed.

In any case, the prepregs 1 in the second heating rise in temperature up to a temperature lower than but close to the curing temperature (slightly higher than 300 degrees C. in cases of polyimide resins) and the temperature is kept for a proper time, 1 hour or such for example. Because, in this temperature range, the resin softens and as well diffusion velocities increase, evaporation of NMP is further promoted. While special care should be given in this step so as not to reach the curing temperature, by elevating temperature successively after this step, curing (resin hardening) could be executed.

After the second heating, the prepregs 1 are once subject to cooling down to the room temperature and the interior of the bag 9 is made back to the atmospheric pressure. The prepregs 1 are taken out of the bag 9, the gas-permeable bodies 5A, 5A are removed, and further the porous films 3 are removed.

Figure 5:
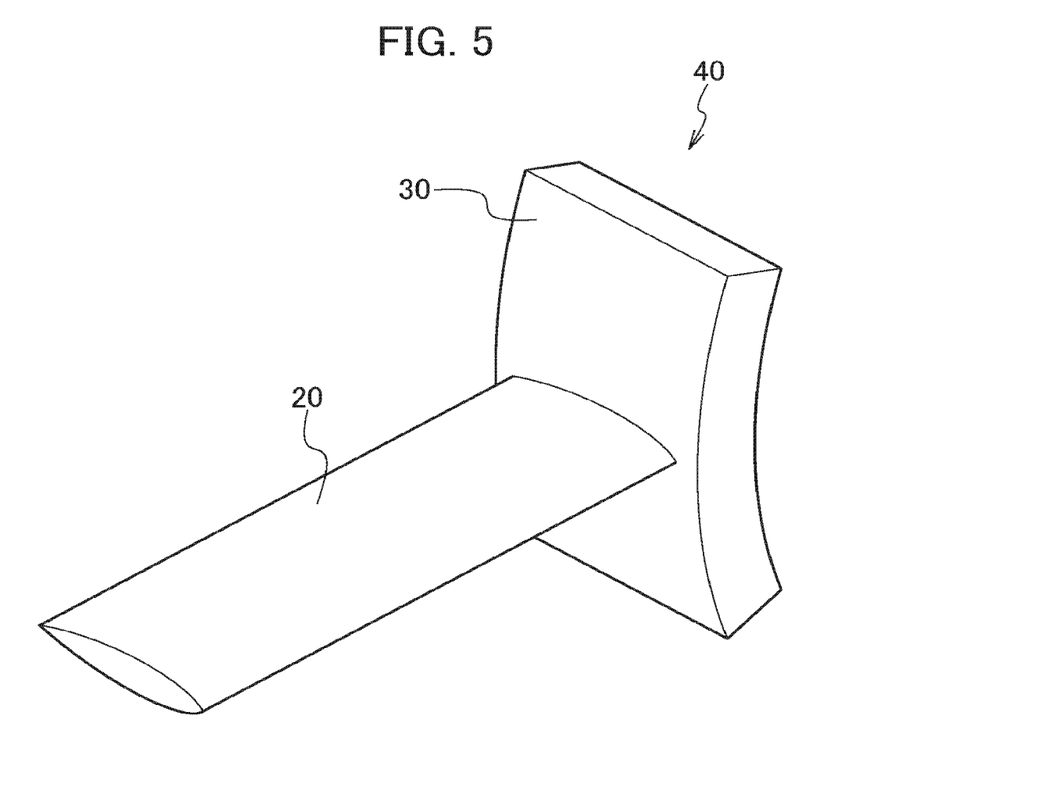
FIG. 5 is a schematic perspective view of a provisionally combined body obtained by provisionally combining a plurality of components.
Figure 6:
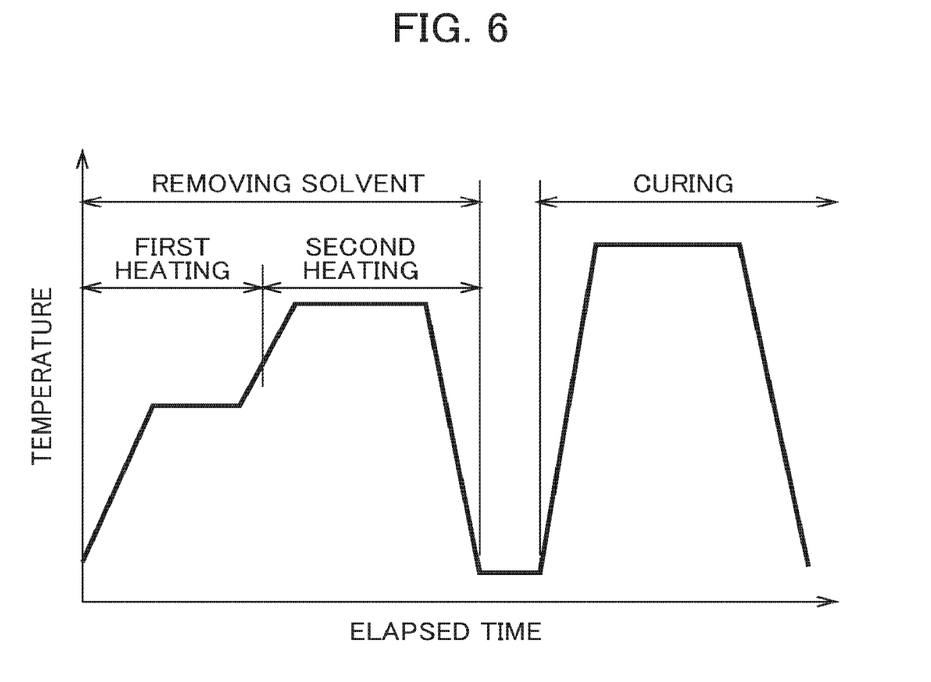
FIG. 6 is an example of a temperature profile.

The taken pre-products are provisionally combined together. FIG. 5 shows an example where the blade pre-product 20 and the disk portion pre-product 30 are provisionally combined to form a provisionally combined body 40. Needless to say, arbitrary pre-products may be provisionally combined together, they may form any angle therein as shown in the drawing, or they may be laid in parallel and then combined together. The provisional combination may be executed by press-fitting or provisional fixation by using any jigs to retain them in close contact. Or, any supplementary adhesive or bond having ability to disappear when heated can be used to temporarily adhere or bond them.

Referring again to FIG. 1, a third heating is executed to cure the provisionally combined body 40. The third heating may be executed under the atmospheric pressure or any reduced pressure. In combination with the heating, molding may be achieved by mechanical pressing or bagging as with the aforementioned steps.

The third heating is achieved by elevating the temperature by a rate of 5 degrees C./min and keeping the temperature at 370 degrees C. for 2 hours, for example. In the third heating, the resin is once softened, the pre-products in the provisionally combined body are unitized, and next the resin is cured to be unitized with the reinforcing fibers.

The temperature range where polyimide resin gets soft is relatively narrow, and is for example 200 degrees C. or higher and lower than 300 degrees C. If the time where the provisionally combined body 40 is left under this temperature range is not sufficiently long, it could cause poor bonding between the pre-products. Thus, for the purpose of softening the resin and promoting bonding between the pre-products, they may be retained in an atmosphere around 280 degrees C. for about several tens minutes for example. Further, to avoid thermal shock, the temperature elevation speed may be reduced as it gets closer to the highest temperature. After a considerable heating time elapses, the body is gradually cooled and then return to the normal temperature.

As a result of the aforementioned process, a fiber reinforced plastic combined body is obtained, which may serve as a final product. Or, any proper finishing process is applied to the combined body.

To verify effects by the present embodiment, the following tests were conducted.

Carbon fiber tow obtained in the name of MR-50R (Mitsubishi Rayon Co., Ltd. at that time) was drawn in parallel and a resin in which PMDA, p-ODA, BAFL and PEPA were admixed in a ratio of 4:4.5:0.5:2 (mass ratio) and dissolved in NMP was impregnated in the tow to produce prepregs. Each prepreg was cut into test pieces with dimensions of 150 mm (width)×150 mm (length).

These test pieces were, according to the steps described above, enclosed with a bag and solvent removal was executed under conditions summarized in Table 1.

TABLE 1

TEST CONDITIONS AND RESULTS

| Test Piece | Solvent (NMP) removal cycle | Curing cycle | weight change (wt %) | Tg (° C.) storage modulus onset | Tg (° C.) loss elastic modulus peak | Tg (° C.) tan δ peak |
|---|---|---|---|---|---|---|
| A | 280° C. × 3 h | 300° C. × 0.5 h + 370° C. × 1 h | 0.31 | 332.3 | 345.8 | 363.5 |
| B | same as above | same as above | 0.50 | 315.3 | 328.3 | 371.1 |
| C | same as above | same as above | 0.67 | 316.9 | 329.4 | 366.7 |
| D | 120-285° C. × 24 h | 300° C. × 1 h + 370° C. × 1 h | 0.57 | 312.2 | 326.1 | 375.5 |
| E | same as above | same as above | 0.96 | 315.1 | 334.9 | 349.2 |
| F | 100° C. × 3 h + 120-285° C. × 24 h | 265-300° C. × 1 h + 320-370° C. × 2 h | 0.32 | 329.9 | 344.8 | 366.8 |
| G | same as above | same as above | 0.17 | 342.6 | 358.0 | 375.6 |
| H | 50° C. × 2 h + 150-285° C. × 15 h | 265-300° C. × 1 h + 320-370° C. × 3 h | 0.36 | 355.4 | 371.3 | 387.8 |
| I | same as above | same as above | 0.12 | 368.8 | 378.1 | 386.9 |
| J | same as above | same as above | 0.28 | 359.6 | 375.5 | 390.8 |
| K | same as above | same as above | 0.14 | 360.9 | 378.8 | 374.2 |
| L | same as above | same as above | 0.11 | 368.2 | 382.5 | 391.2 |
| M | same as above | same as above | 0.12 | 362.8 | 375.9 | 383.6 |
| N | same as above | same as above | 0.11 | 376.9 | 392.4 | 400.1 |
| O | same as above | same as above | 0.17 | 378.9 | 394.6 | 401.1 |

In regard to the test pieces A through C, solvent removal was executed merely by heating at 280 degrees C. In regard to the test pieces D and E, the solvent removal step was started from a lower temperature, namely 120 degrees C., and the temperature was elevated by a rate of 3 degrees C./min up to 285 degrees C., and heating for 24 hours in total was executed. In regard to the test pieces F and G, low temperature heating at 100 degrees C. for 3 hours was preliminary executed and next temperature elevation similar to that for the test pieces D and E was executed. In regard to the test piece H and the rest, low temperature heating at 50 degrees C. for 2 hours was executed and subsequently stepwise temperature elevation was executed.

After the solvent removal steps, the respective prepregs were set back to the atmospheric pressure and taken out of the bag. Next the respective prepregs were stacked to form stacked bodies of 4 mm in thickness. They were subject to curing under conditions described in Table 1 and then fiber reinforced members were obtained.

Further, three-point bend test pieces of 5 mm (width)×50 mm (length) were respectively cut out from the obtained fiber reinforced members, and, after drying at 70 degrees C. for 48 hours or longer, weight measurement was executed and recorded. Next, viscoelasticity measurement was executed on the respective test pieces by the three-point bending (90 degrees) test method compliant with ASTM D7028-07 in a temperature range from 250 to 450 degrees C. (temperature elevation by 5.0 degrees C./min). The measurement was executed by a viscoelasticity measurement device RSA-G2 (TA INSTRUMENTS). Changes in storage modulus, loss elastic modulus and loss tangent (tan δ) depending on temperatures were measured and then Tg was calculated from respective curves. Results are shown in rightmost three columns of Table 1.

Further, weight measurement was executed on the test pieces after the viscoelasticity measurement, and weight changes (reduction) were calculated as compared with the prior weights. Results are shown in the column around the center of Table 1. These weight changes are considered to be corresponding to the amounts of residual NMP contained in the fiber reinforced members.

The test pieces A to E, in which solvent removal was executed merely at the relatively high temperature without a step corresponding to the first heating, show relatively large weight changes (residual NMP amounts) that are 0.31-0.96 wt % and also show relatively large variation in the changes. Tg thereof, as calculated from the storage moduli for example, are relatively low, namely 312.2-332.3 degrees C., which are significantly low in light of the glass transition temperature inherent to the resin.

The test pieces F and G by the solvent removal including the heating step at the lower temperature (100 degrees C.) show weight changes in a range of 0.17-0.32 wt % and Tg in a range of 329.9-342.6 degrees C., any of which are improved values.

The test pieces H to O by the solvent removal including the heating step at the further lower temperature (50 degrees C.) show weight changes in a range of 0.11-0.36 wt % and Tg in a range of 355.4-378.9 degrees C., where the glass transition temperature is prominently improved.

As 280 degrees C. or 285 degrees C. exceeds the boiling point of NMP, the conventional technical knowledge teaches that these temperatures should be more helpful to removal thereof. As being understood from the aforementioned test results, however, NMP remains in the order of several weight per mille. It is acknowledged that even such a small amount of residual solvent could lower the glass transition temperature of the resin. It is further acknowledged that insertion of a low temperature heating step such as 100 degrees C. or less, or less than 100 degrees C., could rather reduce the amount of residual solvent and lead to improvement of the glass transition temperature of the resin.

As being understood from the aforementioned description, in the present embodiment, before curing, the step for removing solvent independently therefrom is executed, and, by executing the relatively low temperature heating and the pressure reduction in combination particularly in the solvent removal step, removal of NMP is promoted. By using the heating step below 100 degrees C. as opposed to the general technical knowledge, residual NMP in the range of several weight per mille is successfully removed and then the glass transition temperature is prevented from being lowered, thereby enabling production of fiber reinforced plastics with improved high temperature properties. While it is still not so clear why such a low temperature promotes reduction of NMP, it could be presumed that to evaporate NMP with preventing resin softening by the low temperature heating step promotes further evaporation in the subsequent heating steps.

While the above descriptions relate to an example where the pre-products before being cured are bonded together, the subject of bonding may include another component. Any other components of other resins, ceramics, metals or composite materials, for example, may be bonded to pre-products before being cured. The other components subject to bonding, of course, include pre-products of cured fiber reinforced plastics. As the other components exemplified are those having various shapes such as fins for directing gas flow, nuts for tightening, anchors for bonding and such.

Figure 7:
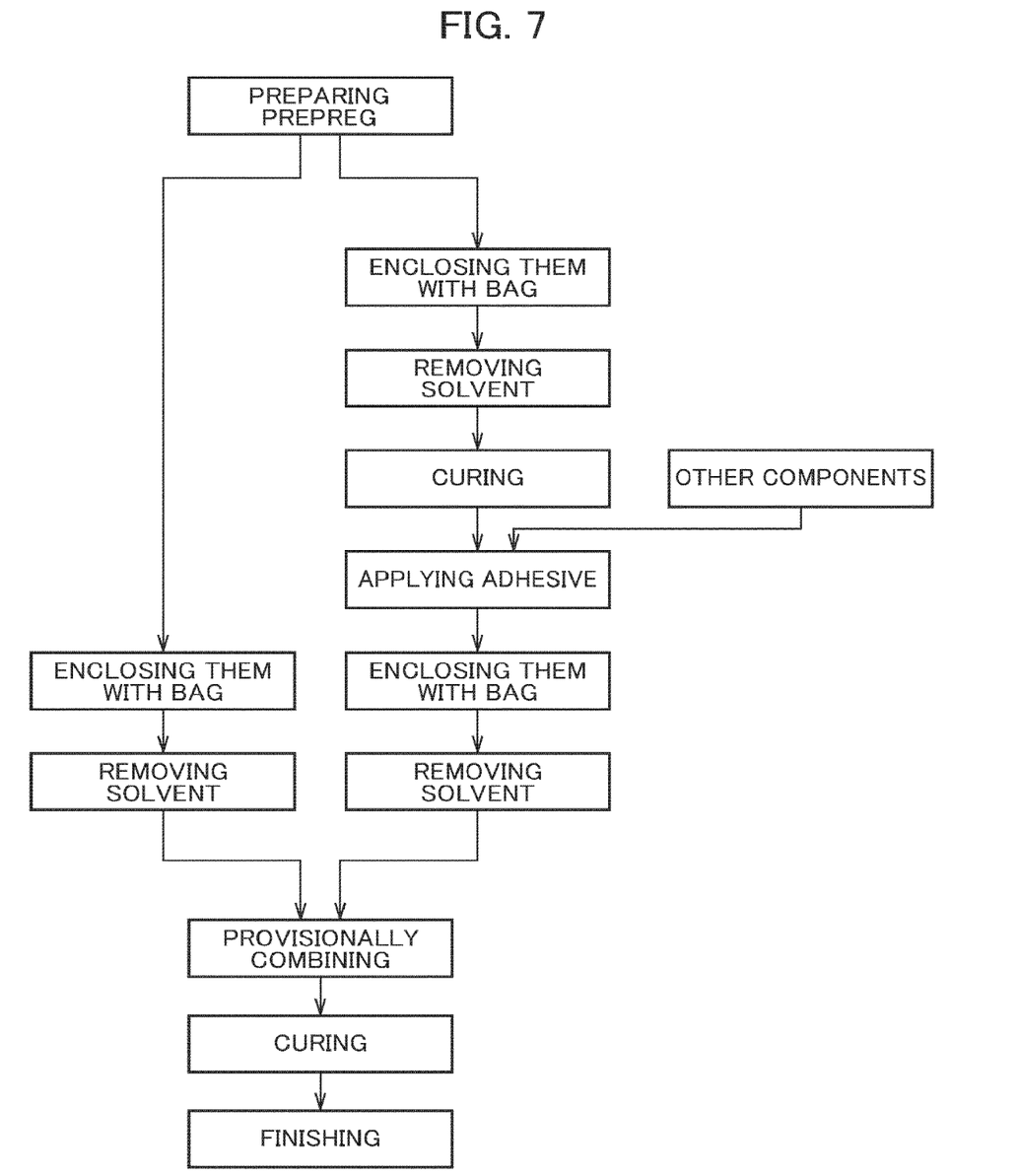
FIG. 7 is a flowchart schematically describing a method for bonding heterogeneous components.

Specifically, referring to FIG. 7, any other components or instead or additionally pre-products cured in advance in the way as described above may be prepared before provisional bonding, and provisionally bonded to pre-products before being cured but from which the solvent is removed, and then curing may be executed.

Then the resin contained in the pre-products before being cured softens in the process of the curing and fills in the interface of the provisional bonding to bond the pre-products together. As this bonding may cause insufficient bonding power, adhesive may be in advance applied to the cured pre-products or the other components.

Any adhesive having a quality to cure along with the aforementioned resin, or a resin identical to the aforementioned resin, is applicable to such adhesive. Specifically, one obtained by dissolving thermally addition-type imide oligomer in NMP for example may be used. As NMP is poorly volatile as described already, preferably the solvent is removed prior to the provisional bonding.

Solvent removal may be executed in a way similar to that described already. Specifically, it may be executed by enclosing cured pre-products or any other components with a proper gas-impermeable shielding body such as the bag 9 for example and heating them (the first heating and the second heating) for removing solvent under reduced pressure as described already.

As the solvent removal is done in advance, it is prevented that the solvent creates its vapor in the interface of the bonding in the process of curing and in consequence interferes bonding. Further, according to this process, the resin functioning as adhesive uniformly covers the surfaces of the cured pre-products or the other components, it is beneficial in promoting bonding. Moreover, as described already, when the solvent is removed and it comes back to the normal temperature, as the solvent is solid, one can easily handle the product.

Next, either or both of the cured pre-products and the other components with the adhesive applied in advance are provisionally bonded to the pre-products before being cured. The way and the aspect of provisional bonding are similar to those described already.

The provisionally bonded pre-products are subject to curing in a way as described already to be bonded together, thereby giving a fiber-reinforced plastic combined body. As described already, this may serve as a final product, or any proper finishing process is applied to the combined body.

Although certain embodiments have been described above, modifications and variations of the embodiments described above will occur to those skilled in the art, in light of the above teachings.

INDUSTRIAL APPLICABILITY

A method for producing a fiber-reinforced plastic combined body is provided, which can control the remaining NMP content in the order of several per mille in weight permillage and can also combine plural components together without any adhesion.

What is claimed is:

1. A method for producing a fiber-reinforced plastic combined body from a prepreg, comprising:
heating the prepreg in an atmosphere above a room temperature and lower than a curing temperature of the prepreg;
provisionally combining pre-products obtained by the heating together or with another component to form an angle between the pre-products; and
retaining and curing the combined pre-products at the curing temperature or higher,
wherein the heating includes executing a first heating to retain the prepreg in a first atmosphere, a temperature of the first atmosphere being above a room temperature and not higher than 100 degrees C., and, after executing the first heating, executing a second heating to retain the prepreg in a second atmosphere, a temperature of the second atmosphere being not lower than 150 degrees C. and lower than a curing temperature of the prepreg.

2. The method of claim 1, wherein the prepreg includes any of polyimide resins.

3. The method of claim 1, wherein the prepreg includes N-methyl-2-pyrrolidone.

4. The method of claim 1, wherein, in the heating, the prepreg is set along a mold for molding, whereby the prepreg is given a complementary shape to the mold.

5. The method of claim 1, further comprising:
before the heating, putting the prepreg between porous films, further putting the prepreg with the films between gas-permeable bodies, and enclosing the prepreg along with the gas-permeable bodies and the films with a gas-impermeable bag; and
depressurizing an interior of the bag, whereby depressurizing the atmosphere below the atmospheric pressure.

6. The method of claim 1, wherein the first heating and the second heating are executed in series.

7. The method of claim 1, wherein, in the first heating, the prepreg is retained in the first atmosphere for 30 minutes or longer and 24 hours or shorter.

* * * * *